United States Patent
Tsantrizos et al.

[11] Patent Number: 5,958,264
[45] Date of Patent: Sep. 28, 1999

[54] PLASMA GASIFICATION AND VITRIFICATION OF ASHES

[75] Inventors: Peter G. Tsantrizos, Westmount; Michel G. Drouet, Montreal; Theodora Alexakis, Ville St-Laurent, all of Canada

[73] Assignee: Pyrogenesis Inc., Montreal, Canada

[21] Appl. No.: 08/948,962

[22] Filed: Oct. 10, 1997

[30] Foreign Application Priority Data

Oct. 21, 1996 [CA] Canada ................................ 2188357

[51] Int. Cl.⁶ ............................. B23K 10/00; H05B 7/00
[52] U.S. Cl. ................................ 219/121.38; 219/121.37; 219/121.52; 373/22; 110/346; 110/250
[58] Field of Search .......................... 219/121.36, 121.37, 219/121.38, 121.48, 121.59, 121.52; 373/18–24; 110/246–250, 346

[56] References Cited

U.S. PATENT DOCUMENTS

| | | | |
|---|---|---|---|
| 3,749,803 | 7/1973 | Camacho | 13/9 |
| 4,546,483 | 10/1985 | Lugscheider et al. | 373/24 |
| 4,960,380 | 10/1990 | Cheetham . | |
| 5,161,471 | 11/1992 | Piekos . | |
| 5,319,176 | 6/1994 | Alvi et al. | 219/121.59 |
| 5,548,611 | 8/1996 | Cusick et al. | 373/18 |
| 5,606,925 | 3/1997 | Boen et al. | 110/346 |
| 5,734,673 | 3/1998 | Kurahashi et al. | 373/20 |

FOREIGN PATENT DOCUMENTS

| | | |
|---|---|---|
| 2106746 | 3/1994 | Canada . |
| 0625869 | 11/1994 | European Pat. Off. . |
| 0645584 | 3/1995 | European Pat. Off. . |
| 0647598 | 4/1995 | European Pat. Off. . |
| 95/17981 | 7/1995 | WIPO . |

Primary Examiner—Mark H. Paschall
Attorney, Agent, or Firm—George J. Primak

[57] ABSTRACT

This invention discloses a method and an apparatus for gasification and vitrification of ashes, such as produced in a hog-fuel fired boiler, by means of a plasma arc. The ashes are introduced into a shaft furnace where two or three tiltable electrodes are located. The plasma arc is ignited between these electrodes which are then tilted from a horizontal to an essentially vertical position whereby the arc is lengthened and then broken into separate arcs, one between each electrode and the slag accumulated at the bottom of the furnace. This plasma arc helps to burn off the organics in the ashes, producing combustion gases that can be used as a source of energy for the boiler, and to keep the slag in molten state, which allows its periodic removal through a tap hole.

18 Claims, 4 Drawing Sheets

PLASMA GASIFICATION AND VITRIFICATION OF ASHES

BACKGROUND OF THE INVENTION

1. Field of the Invention

The present invention relates to a new and improved method and apparatus for the gasification of the organics contained in ashes, such as produced in hog-fuel fired boilers, and vitrification of the inorganics left after gasification.

2. Brief Description of the Prior Art

Methods and apparatus have been proposed to more efficiently burn all the available fuel in waste products, such as wood scraps, bark, shavings, plywood trim, and rejects. The objectives are both to maximize the amount of combustion heat and to minimize the volume of the ash produced. Apparatus and methods have also been proposed for reburning ash material of a previously burned primary fuel. The extent of the ash problem is well illustrated by the fact that, for example, in Canada approximately 1000 tonnes of ashes are produced every day from the sole burning of bark.

Thus, in U.S. Pat. No. 5,161,471, the reburning apparatus has been adapted to work in parallel with the primary combustion unit. In this case, combustion air is introduced over the whole floor area of an ash reburn vessel. The reburned ash is then disposed of without further treatment.

By contrast, in U.S. Pat. No. 4,960,380, there is disclosed a method and an apparatus for the reduction of solid waste material, wherein a powerful laser is used to produce a plasma in which the solid waste materials are reduced to a slag-like material. In this case, however, the treatment is not adapted to work in parallel with the primary combustion unit and the energy is not recovered, the objective being solely to produce a slag.

In Canadian Patent Application No. 2,106,746, a melting furnace is disclosed for the treatment of the combustion ash resulting from incineration of municipal and other sorts of waste by melting the ash and utilizing the unburnt carbon contained in the ash itself as the main source of heat. This combustion is assisted by a plasma torch which uses air as its working gas. The treatment of the ash is made in line with the primary combustion unit of the waste.

OBJECTS AND SUMMARY OF THE INVENTION

It is an object of the present invention to provide a new and improved method and apparatus to treat the hot ash material received from a primary combustion unit, such as that operating in the pulp and paper industry, wherein the primary fuel is hog-fuel and the primary combustion unit is a hog-fuel fired boiler, although the invention is not limited to such boilers.

Another object of the present invention is to provide a new and improved method and apparatus for the gasification of the ashes to produce valuable gases to be combusted in the main boiler, thus reducing the amount of purchased gases required to sustain the primary combustion.

Still another object of the present invention is to provide a new and improved method and apparatus for the vitrification of the solid residues resulting from the gasification of the ashes.

Other objects and advantages of the invention will be apparent from the following description thereof.

According to the present invention, the ashes from the boiler are fed at the top of a vertical shaft furnace where the gasification of the organics occurs. At the bottom end of the furnace, two or three electrodes are used to sustain an electric arc which heats the residue of the gasification to melting temperature.

In order to optimize the economics of the process, the energy required for heating the material to the gasification temperature of about 2000° F. (1100° C.) and the energy required for gasification will be provided by combusting part of the organics contained in the waste. Only the extra energy required for vitrification at about 2700° F. (1500° C.) of the inorganic residues will be provided by the electric arc.

Furthermore the gasification will be achieved by injecting both air and steam to produce carbon dioxide and hydrogen according to the following reaction equations:

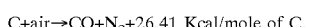
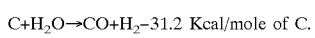

The relative amounts of air and steam injected are optimized in order to minimize the required electrical input energy taking into account the composition of the material and its initial temperature. A typical example is presented later in this disclosure.

The apparatus of the present invention is characterized primarily in that it is a shaft furnace which, when viewed from top to bottom in the vertical direction, comprises three zones having the following combination of features, namely:

(1) an ash feeding system and a gas exhaust outlet at the top of the shaft furnace;

(2) a heating zone, located at mid-level, with two or three arc electrodes;

(3) means such as a crucible, located at the bottom of the shaft furnace, to contain the molten slag, and equipped with a tap hole for pouring the slag.

The ash feeding system may include a slide door which would allow the control of the amount of ashes introduced into the furnace from an ash hopper located above the shaft furnace.

The orientation of the arc electrodes located at mid-level can be varied: At the start of the operation, the electrodes are placed in a horizontal position facing one another, and they are made to contact one another to ignite the arc. After arc ignition, the distance between the electrodes is slowly increased and, at the same time, the orientation of the electrodes is varied towards the vertical direction. As a result, the frozen slag remaining from a previous operation is heated by the arc and starts to melt. With increasing temperature, the slag electrical conductivity increases and arcing occurs between the electrodes and the melt, short circuiting the arc between the electrodes. This operation with two or three arcs being transferred to the molten slag is the normal operation, with heat being generated both by the arcs and the resistance heating through the slag.

Gasification of the organics contained in the ashes occurs in the shaft furnace, and the products of gasification are discharged through the gas outlet located at the upper end of the shaft furnace and may be used as a heat source for the boiler. The remaining ash residues fall into the crucible at the bottom of the shaft furnace, where they are melted. The molten slag is poured periodically through the crucible tap hole.

As each electrode wears off during operation, it is necessary:

(a) to reset the electrode position before ignition (a reset electrode is provided for that purpose);

(b) to monitor the arc length of each of the arcs during operation (an arc voltage probe connected to the melt at the bottom of the crucible is provided for that particular purpose); and (c) to protect the electrode side walls from gasification (a refractory sleeve enclosing each electrode is provided for that purpose).

In summary, the method of the present invention essentially comprises:

(a) feeding a predetermined quantity of ashes into a shaft furnace provided in its heating section with two or three tiltable plasma arc electrodes;

(b) igniting the arc between the electrodes when they are positioned essentially horizontally, facing one another;

(c) tilting the electrodes downwardly, thereby increasing the distance between their ends and lengthening the plasma arc which helps to heat the ashes, producing combustion gases and slag;

(d) allowing the tilting to proceed until the electrodes are positioned essentially vertically and whereby the arc between them is broken while separate arcs are formed, one between each electrode and the slag accumulated at the bottom of the furnace, thereby heating said slag and maintaining it in a molten state; and (e) tapping the molten slag when required.

And the apparatus of the present invention essentially comprises:

(a) a shaft furnace with an opening at its top end to receive a batch of ashes;

(b) a gas exhaust outlet at the upper end of said furnace for exhaust of combustion gases;

(c) two or three plasma arc producing electrodes located at about mid-level of the furnace and positioned essentially horizontally facing each other and means for igniting an arc between said electrodes;

(d) means for tilting the electrodes having a plasma arc between them, from an initial horizontal position to an essentially vertical position in which the arc is formed between each electrode and the slag contained at the bottom of the furnace, thereby producing molten slag; and (e) a tap hole at the bottom end of the furnace for discharging the molten slag when required.

BRIEF DESCRIPTION OF THE DRAWINGS

The invention will further be described with reference to the accompanying drawings, in which:

FIG. 1(*a*) shows a side view of the shaft furnace in the ignition mode;

FIG. 1(*b*) shows a side view of the shaft furnace in the arc elongation mode; and FIG. 1(*c*) shows a side view of the shaft furnace in the arc transfer operation mode also shows that the crucible may be removed from the furnace for maintenance;

DETAILED DESCRIPTION OF THE INVENTION

In the various figures, illustrating a preferred embodiment of the present invention, the same reference numbers are used to describe the same parts.

Figure 1A:
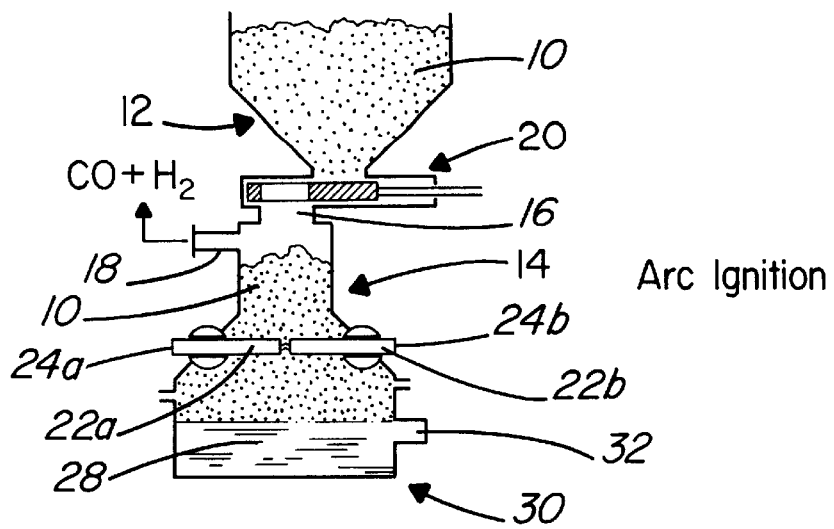
FIGS. 1(*a*) to 1(*c*) show schematic diagrams illustrating the operations of the shaft furnace according to the present invention as follows.

In FIGS. 1(*a*) to 1(*c*), the method of the present invention is illustrated. According to this method, ash 10 is fed from hopper 12 of a boiler or the like, into a shaft furnace 14 which, at its upper end, has a feeding mouth 16 and a gas exhaust outlet 18. The feeding of the ash 10 is effected through a sliding door system 20 which, once the predetermined amount of ashes has been fed into the shaft furnace 14, will seal the outlet from the hopper 12 so that no gases produced in the shaft furnace 14, will be discharged into the hopper 12, but rather will be conducted through the outlet 18 to serve as an energy source for the boiler (not shown).

Arc electrodes 22a, 22b are located in the mid-level of the shaft furnace 14, which constitutes the heating zone of the furnace. These electrodes are powered via electric cables 24a, 24b by an AC or a DC electrical power supply. However, if three electrodes are used, a three phase AC electrical supply is required.

In the step of FIG. 1(*a*), arc ignition is initiated between arc electrodes 22a, 22b positioned essentially horizontally, and facing one another. The ash contained in the shaft furnace 14 is thereby heated and a portion of the organics in the ash are burned producing some of the energy for gasification thereof, while the inorganic which form the slag are melted as shown in the step of FIG. 1(*b*). At the same time, the electrodes 22a, 22b are tilted downwardly producing a longer arc 26. Then, the arc transfer operation proceeds as shown in the step of FIG. 1(*c*) and whereby the molten slag 28 accumulated in the crucible 30, which is located at the bottom of the shaft furnace 14, is contacted by the arc created between each electrode and the slag. At this point of the arc transfer, the arc is short-circuited between the two electrodes and the two arcs 26a, 26b thereby produced are transferred into the slag 28, generating heat and helping to melt the slag. Molten slag is then periodically discharged through a tap hole 32. In view of the intense heat generated in the crucible 30, periodic crucible maintenance is required, and the crucible, made detachable from the shaft furnace for this purpose, may be removed for maintenance as shown in FIG. 1(*c*). Air and steam are also injected into the furnace via lances 39 and 40 respectively (FIG. 2) to assist in the gasification of the organics in the ashes and to produce a combustion gas suitable to be used as a source of energy in the boiler or the like.

Figure 2:
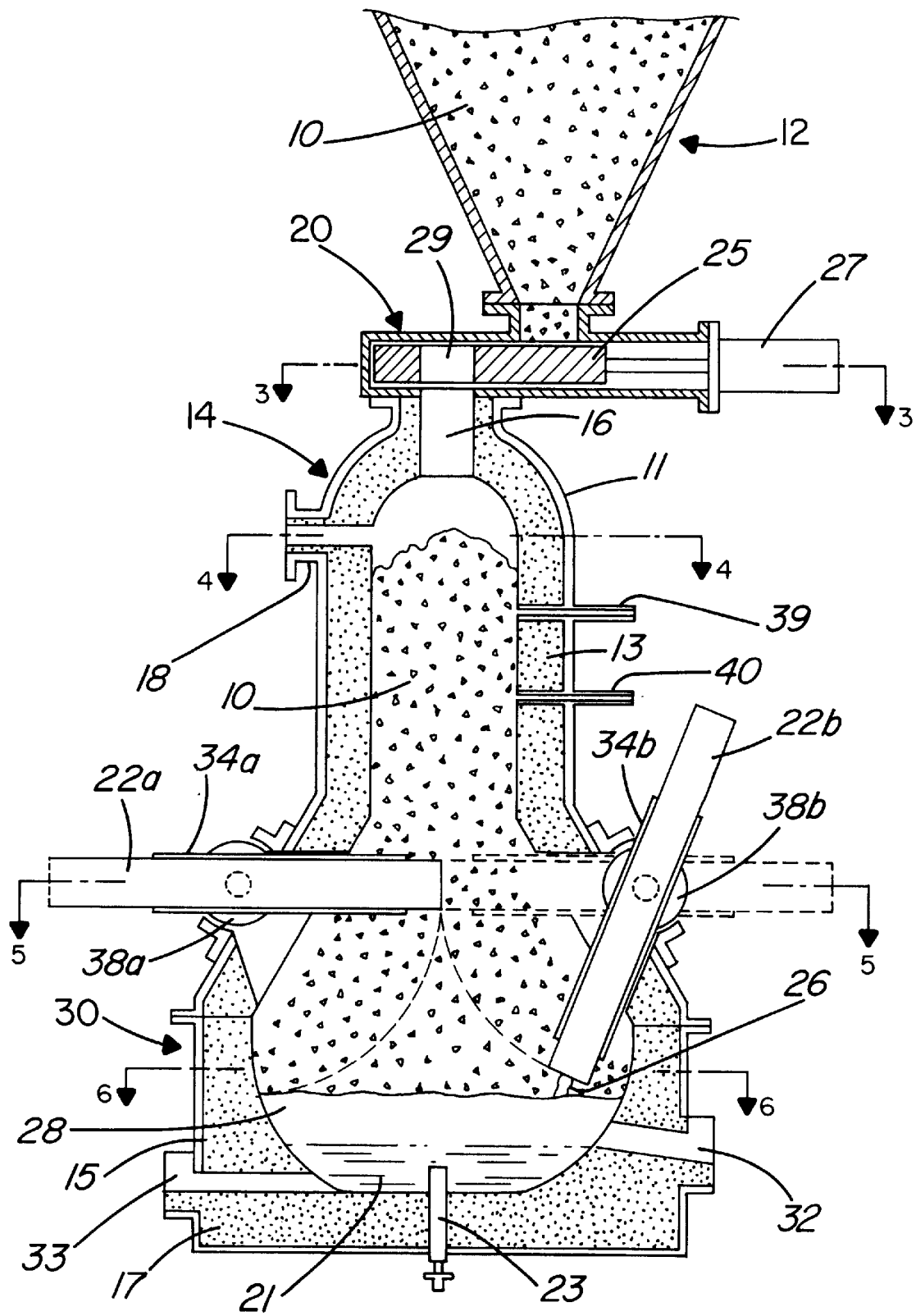
FIG. 2 is a vertical cross-sectional view of the shaft furnace, in accordance with the present invention, but omitting the electrode displacement mechanism.

The shaft furnace 14 is illustrated in greater detail in FIG. 2. It consists of a steel shell 11 made of a hollow steel cylinder joined to a hollow conical section. The furnace interior walls are lined with a high temperature refractory layer or lining 13. The inner side of this refractory lining 13 may be made of a magnesia-carbon brick, such as manufactured by North American Refractories, because of its good capacity to resist severe mechanical stresses in the presence of metal and slag at temperature typically up to 1700° C. On the outside of the refractory lining 13, next to the steel shell 11, one may use an insulating refractory material such as a magnesia gunning mix, also manufactured by North American Refractories.

Figure 1B:
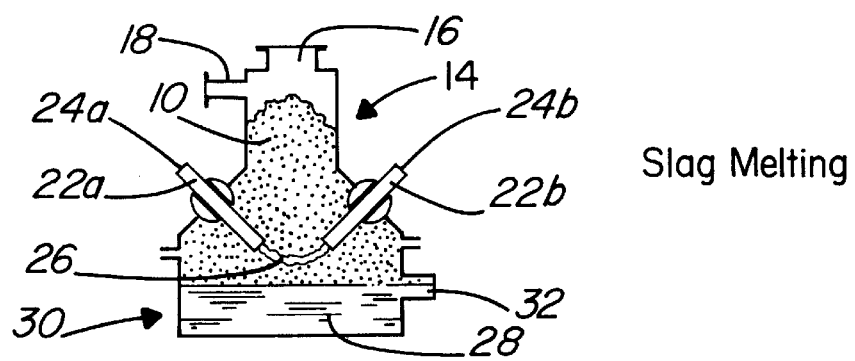
Figure 1C:
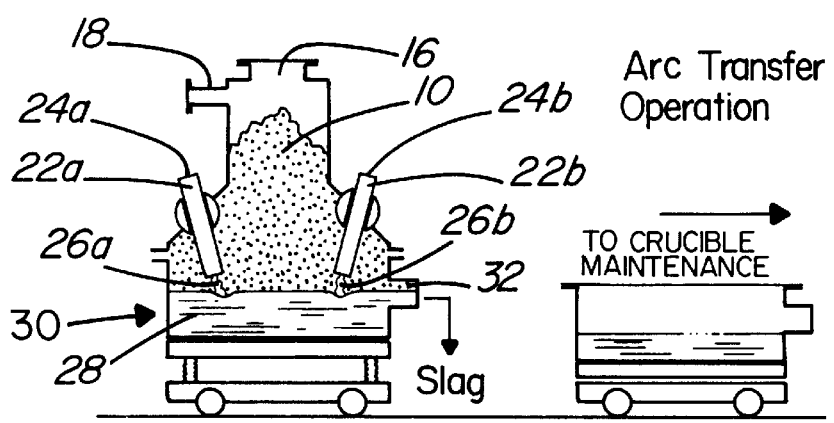

In normal operation, the shaft furnace 14 is heated by electric plasma arcs 26a, 26b struck between the two graphite electrodes 22a, 22b and the molten slag 28, as illustrated in FIG. 1(c) and also by the resistive heating of the molten slag 28 resulting from the conduction of the electrical current through such slag.

The bottom end of the furnace is provided with a cylindrical crucible 30, also made of a steel shell 15 lined with a refractory lining 17 which may be the same as the lining of the shaft furnace 14. The crucible may be equipped with two tap holes 32 and 33, used to pour the molten slag 28 and molten metal 21 respectively, if such molten metal is contained at the bottom of the crucible. A steel probe 23 is also mounted at the bottom of the crucible and is used during the operation of the furnace to monitor the voltage of the melt in order to balance the electrical power delivered by each of the two arcs, by adjusting the position of each electrode 22a, 22b, thus correcting for the erosion of each electrode tip by the arc.

Figure 3:
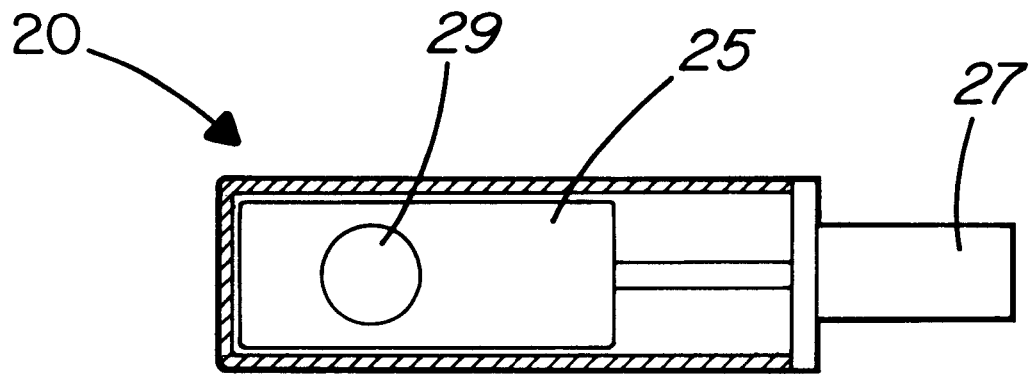
FIG. 3 is a horizontal cross-sectional view of the slide door taken substantially along line 3—3 of FIG. 2.

Furthermore, as illustrated in FIG. 2, the top end of the shaft furnace has an opening 16 connected to a slide door system 20 which is also shown in FIG. 3 by way of a top, partly sectional view. The slide door 25 is moved in the horizontal direction by a piston 27 and is used to prevent any gases produced in the shaft furnace 14 from discharging into the hopper 12 containing the ashes 10.

The slide door 25 is also used to transfer a controlled amount of ashes 10 from the hopper 12 into the shaft furnace 14; for this purpose, the slide door 25 presents an opening 29 which will be filled with ashes 10 from the hopper 12 when the slide door 25 is in the non-extended position; i.e. when the opening 29 is located just beneath the outlet of the hopper 12. Once the opening 29 is filled with ash, the slide door 25 is pushed by the piston 27 and, once in the extended position, illustrated in FIG. 2, the ash material contained in the opening 29 of the slide door 25 falls into the shaft furnace 14 through the opening 16.

Figure 4:
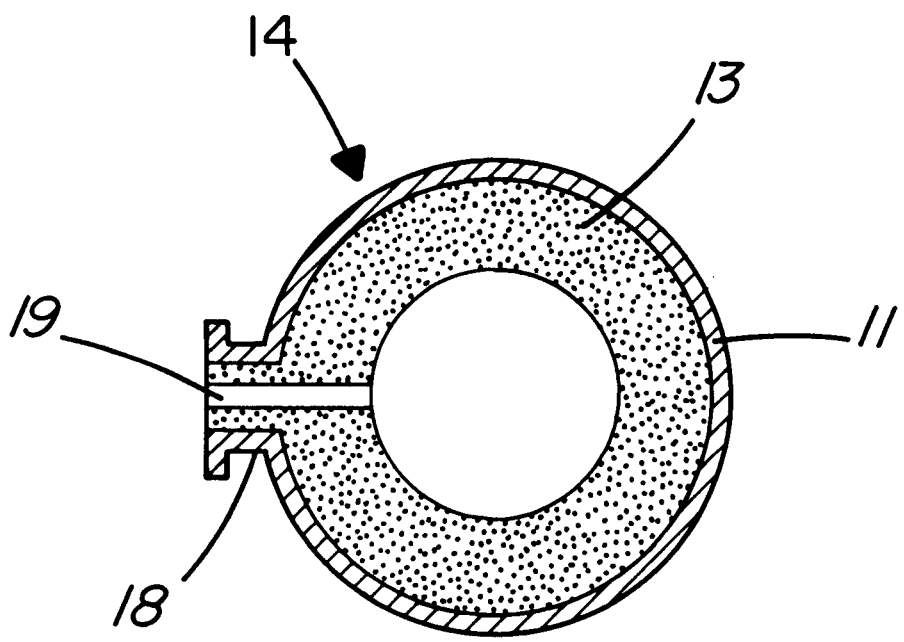
FIG. 4 is a horizontal cross-sectional view of the shaft furnace taken substantially along line 4—4 of FIG. 2.

Moreover, as illustrated in FIGS. 2 and 4, a gas exhaust outlet 18 with an opening 19 is also provided at the upper end of the shaft furnace 14 for discharging the gases produced in the shaft furnace 14 by gasification of the ashes 10.

Figure 5:
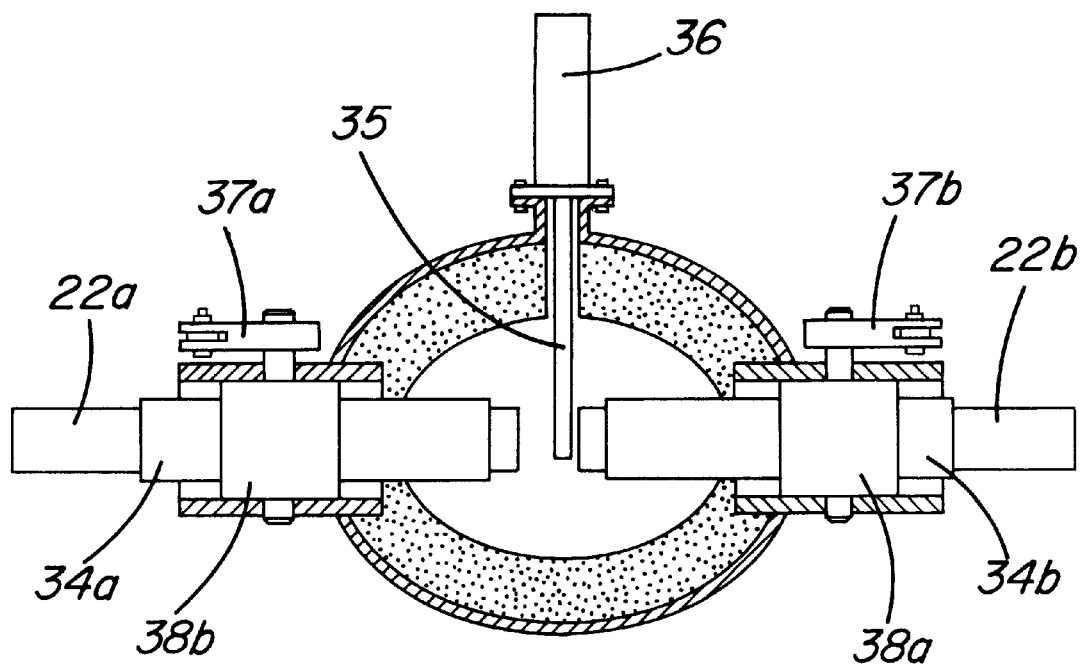
FIG. 5 is a horizontal cross-sectional view of the shaft furnace taken substantially along line 5—5 of FIG. 2, but with one of the electrodes in the reset position.

Referring to FIG. 5, a reset electrode 35 is provided to allow the reset of the position of the electrodes 22a, 22b, before ignition of the arc between said electrodes. The reset operation is required because the electrode tips are continuously worn out by the action of the arc. (c.f. "Physics of High-Current Arcs in the Journal of The Iron and Steel Institute, June 1969, p. 803) For example, for a 3 inch (7.5 cm) graphite electrode operating at a current of 4 kiloamperes, the electrode tip loss per day would be approximately one inch (2.5 cm) in length.

In order to reset the electrode position, the reset electrode 35 is first extended as shown in FIG. 5; then, one at a time, each of the electrodes 22a, 22b is moved by a piston (not shown) until electrical contact is made between the electrode 22a or 22b being positioned and the reset electrode 35; when electrical contact is made, the electrode position controller is reset to zero. Then, the same procedure is repeated for the second electrode. Once the electrode positions have been reset, the reset electrode 35 is pulled back, and the two electrodes 22a, 22b are made to contact one another to ignite the arc.

Following arc ignition between the electrodes 22a, 22b, the electrodes are tilted from the horizontal position by pistons (not shown) acting on levers 37a, 37b which rotate trunnions 38a, 38b holding the electrode refractory sleeves 34a, 34b.

Figure 6:
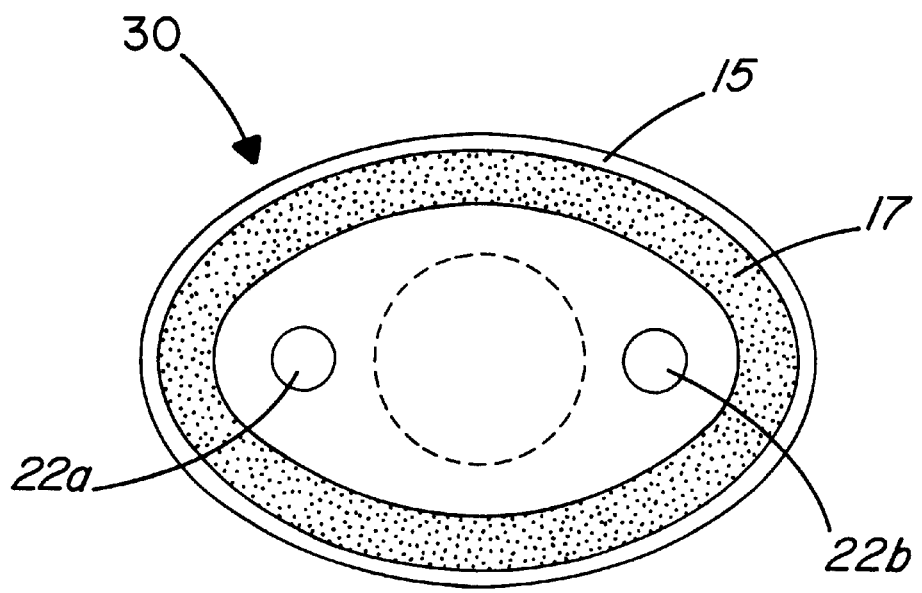
FIG. 6 is a horizontal cross-sectional view of the crucible taken substantially along line 6—6 of FIG. 2.

As illustrated in FIG. 6, the shape of the crucible 30 is designed to ensure that the falling ash material does not affect the displacement of the electrodes 22a, 22b from the horizontal ignition position to the almost vertical normal operating position. Furthermore, the design of the crucible ensures complete melting of the slag 28 (FIG. 2).

The apparatus described above is operated in the following manner:

The shaft furnace 14, installed with connections to the ash hopper 12 for charging with ashes 10, and to the boiler (not shown) for discharging of the gasification product gases (CO+$H_2$) through opening 19, is filled with ashes almost to the top as shown in FIG. 2, by moving the slide door 25 back and forth with piston 27.

The electrodes 22a, 22b are retracted in their sleeves 34a, 34b by a piston (not shown) and raised to the horizontal position using the trunnions 38a, 38b and levers 37a, 37b rotated by pistons (not shown). The reset electrode 35 is extended by piston 36, as shown in FIG. 5. Then, electrode 22a is moved by a piston (not shown) until electrical contact is made between said electrode 22a and the reset electrode 35; when electrical contact is made, the electrode position controller is reset to zero. Then the same procedure is repeated for the second electrode 22b.

Once the position of both electrodes has been reset, the reset electrode 35 is pulled back by piston 36, and the two electrodes 22a, 22b are made to contact one another to ignite a plasma arc between them. Following arc ignition, the distance between the electrodes 22a, 22b is slowly increased by pulling them within their protective refractory sleeves 34a, 34b using pistons (not shown). At the same time, the orientation of the electrodes 22a, 22b is varied towards the vertical direction as shown in FIG. 1(b) by pistons (not shown), acting on levers 37a, 37b which rotate the trunnions 38a, 38b holding the refractory sleeves 34a, 34b. The elongated plasma arc 26 heats the solid residues contained in the ashes and remelts the frozen slag 28 remaining from a previous operation of the furnace as illustrated in FIG. 1(b). With increasing temperature, the slag electrical conductivity increases and the elongated arc is short-circuited through the melt, as illustrated in FIG. 1(c). This operation, with one arc between each electrode and the melt, is the normal operation with heat generated by both arcs and the resistance heating through the melt.

As the melt level rises in the crucible 30, it is necessary to adjust the length of each arc. This is achieved by maintaining the voltage of each arc constant, said voltage being monitored using the voltage probe 23 (FIG. 2) located at the bottom of the crucible 30.

Periodic pouring of the slag 28 is made through the tap hole 32. A molten iron heel 21 is used at the bottom of the crucible 30 (FIG. 2) to ensure that, after slag pouring, a high heat capacity melt remains in the crucible to stabilize the gasification operation, to maintain the two arc operation illustrated in FIG. 1(c) and to protect the voltage probe 23 and ensure its operation of arc voltage monitoring.

The invention is now further illustrated by the following example:

EXAMPLE

Ashes were fed to a shaft furnace at a rate of 5.2 metric tonnes per hour. The heating value of the ash was determined to be 15,738 MJ per metric tonne. The relative amounts of injected air and steam were optimized to minimize the required electrical input energy. In such operation, the various components of the process energy balance are as follows:

| ENERGY COMPONENTS | Input | Absorbed |
|---|---|---|
| Heating of the 5.2 tonnes of ashes to 2,000° F. | | −7,240 MJ |
| Partial combustion of the organics | +17,249 MJ | |
| Heating of the steam from 1,000 to 2,000° F. | | −2,174 MJ |
| Production of synthesis gas by steam injection | | −6,988 MJ |
| Heat losses | | −987 MJ |
| Vitrification of residues | | −1,800 MJ |
| Plasma heating | +1,800 MJ | |
| TOTAL | +19,189 MJ | −19,189 MJ |

The heat and mass balances are further illustrated by the following data:

| INPUT | OUTPUT |
|---|---|
| Waste input | Product gases |
| 5.2 tonnes/hr | 14.95 t/hr |
| 81,842 MJ/hr | 72,069 MJ/hr |
| Air 11.25 t/hr | Slag 2.44 t/hr |
| Steam 1,000° F. | Slag and gas |
| 0.94 t/hr | sensible heat |
| 2,174 MJ/hr | and vessel losses |
| Plasma heat | 13,747 MJ/hr |
| 1,800 MJ/hr | |

The heating value of the product gas is 5.59 MJ per normal cubic meter.

It should be understood that the above described preferred embodiments and example are not limitative and various modifications obvious to those skilled in the art can be made without departing from the spirit and scope of the present invention. For instance, three plasma arc electrodes could be used instead of two, with obvious adjustments, to produce similar results.

We claim:

1. Method for gasification and vitrification of ashes by means of a plasma arc which comprises:
   (a) feeding a predetermined quantity of ashes into a shaft furnace provided in its heating section with two or three tiltable plasma arc electrodes;
   (b) igniting the arc between the ends of the electrodes when they are positioned essentially horizontally, facing one another;
   (c) tilting the electrodes downwardly, thereby increasing distance between their ends and lengthening the plasma arc which helps to heat the ashes, producing combustion gases and slag;
   (d) allowing the tilting to proceed until the electrodes are positioned essentially vertically and whereby the arc between them is broken while separate arcs are formed, one between each electrode and the slag accumulated at the bottom of the furnace, thereby heating said slag and maintaining it in a molten state; and
   (e) tapping the molten slag when required.

2. Method according to claim 1, in which the ashes fed into the shaft furnace are hot ashes from a hog-fuel fired boiler.

3. Method according to claim 2, in which, during burning of the ashes, air and steam are injected into the shaft furnace to form CO and $H_2$ combustion gases which are returned to the boiler as a source of energy.

4. Method according to claim 1, in which the electrodes are made to contact each other to ignite the arc.

5. Method according to claim 1, in which the arcs, are adapted to melt the solid slag remaining from a previous operation.

6. Apparatus for gasification and vitrification of ashes by means of a plasma arc, which comprises:
   (a) a shaft furnace with an opening at its top end to receive a batch of ashes;
   (b) a gas exhaust outlet at the upper end of said furnace for exhaust of combustion gases;
   (c) two or three plasma arc producing electrodes located at about mid-level of the furnace and positioned essentially horizontally facing each other and means for igniting an arc between said electrodes;
   (d) means for tilting the electrodes having a plasma arc between them, from an initial horizontal position to an essentially vertical position in which the arc is formed between each electrode and the slag contained at the bottom of the furnace, thereby producing molten slag; and
   (e) a tap hole at the bottom end of the furnace for discharging the molten slag when required.

7. Apparatus according to claim 6, further comprising an ash feeding system for feeding the ashes into the shaft furnace in controlled amounts.

8. Apparatus according to claim 6, in which the electrodes are made of graphite.

9. Apparatus according to claim 6, further comprising a reset electrode to reset the position of the electrodes prior to ignition of the arc.

10. Apparatus according to claim 6, further comprising a voltage probe to monitor the arc length of each arc formed between each electrode and slag at the bottom of the furnace.

11. Apparatus according to claim 6, further comprising a refractory sleeve enclosing each electrode to protect its sidewalls from gasification.

12. Apparatus according to claim 6, in which the bottom of the furnace where the slag is located comprises a crucible.

13. Apparatus according to claim 12, in which the tap hole is located in the crucible.

14. Apparatus according to claim 12, in which the crucible is also provided with a pool of metal at its bottom.

15. Apparatus according to claim 14, in which a second tap hole is provided in the crucible to tap the metal when required.

16. Apparatus according to claim 12, in which the crucible is detachable from the shaft furnace for maintenance purposes.

17. Apparatus according to claim 6, in which two electrodes are used and an AC or a DC electrical power supply is provided to power said electrodes.

18. Apparatus according to claim 6, in which three electrodes are used and a three phase AC electrical power supply is provided to power said electrodes.

* * * * *